United States Patent
Igarashi et al.

(10) Patent No.: US 9,620,156 B2
(45) Date of Patent: Apr. 11, 2017

(54) MAGNETIC HEAD DEVICE

(71) Applicant: TDK CORPORATION, Tokyo (JP)

(72) Inventors: Katsuhiko Igarashi, Tokyo (JP); Makoto Orikasa, Tokyo (JP); Takashi Kawashima, Tokyo (JP); Hisayuki Abe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/071,989

(22) Filed: Mar. 16, 2016

(65) Prior Publication Data

US 2016/0275976 A1  Sep. 22, 2016

(30) Foreign Application Priority Data

Mar. 20, 2015  (JP) ................................. 2015-058494

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
CPC ................................ G11B 5/48; G11B 5/4873
USPC .............................................. 360/144–244.8
See application file for complete search history.

(56) References Cited

U.S. PATENT DOCUMENTS

| 5,759,418 | A | * | 6/1998 | Frater | G11B 21/16 216/22 |
| 6,396,665 | B1 | * | 5/2002 | Asano | G11B 5/4833 360/264.2 |
| 6,728,072 | B1 | * | 4/2004 | Van Sloun | G11B 5/4813 360/244.3 |
| 6,970,326 | B2 | * | 11/2005 | Watanabe | G11B 5/4833 360/244.1 |
| 8,049,995 | B1 | * | 11/2011 | Ee | G11B 5/4813 360/244.6 |
| 8,070,907 | B2 | * | 12/2011 | Tanaka | B23K 26/0608 156/272.8 |
| 2007/0146934 | A1 | * | 6/2007 | Boljanovic | G11B 5/4826 360/244.6 |
| 2008/0013215 | A1 | * | 1/2008 | Kido | G11B 5/4826 360/244.2 |
| 2012/0140354 | A1 | * | 6/2012 | Takeo | G11B 5/1278 360/55 |
| 2016/0275975 | A1 | * | 9/2016 | Kawashima | G11B 5/4833 |

FOREIGN PATENT DOCUMENTS

| JP | H05-303855 A | 11/1993 |
| JP | H07-178582 A | 7/1995 |
| JP | 10092135 A | * 4/1998 |

* cited by examiner

*Primary Examiner* — Allen T Cao
(74) *Attorney, Agent, or Firm* — Oliff PLC

(57) ABSTRACT

A magnetic head device with high joint strength in an arm and a suspension is provided. The magnetic head device comprises an arm, a suspension overlapping with a leading end part of the arm, a slider located at a leading end part of the suspension, and a joint part that is located between the leading end part of the arm and the suspension and that joins the arm and the suspension, while the joint part includes Sn.

12 Claims, 8 Drawing Sheets

MAGNETIC HEAD DEVICE

TECHNICAL FIELD

The present invention relates to a magnetic head device.

BACKGROUND

In a magnetic disk device, a head stack assembly (HSA) performs reading/writing of magnetic record. The HSA comprises, for example, a carriage having a plurality of arms and a head gimbal assembly (HGA) joined to each arm. The HGA has a suspension joined to a leading end part of each arm, and a slider located at a leading end part of the suspension. A magnetic head (such as thin-film magnetic head) is embedded in the slider. A carriage (E-shaped carriage) having a plurality of arms may be referred to as an E-block.

In a related art, fitting and joining disclosed in Japanese Unexamined Patent Publication No. H5-303855 has been known as a method of joining an arm and a suspension. In the method disclosed in Japanese Unexamined Patent Publication No. H5-303855, a flange is formed on the suspension and a fitting hole is formed in the arm. A position of the flange and a position of the fitting hole are aligned and the flange of the suspension is fitted into the fitting hole of the arm. Then, a metal ball is introduced by a pressurization shaft from a hole of the flange and the metal ball goes through the each hole. A diameter of the metal ball is larger than the minimum diameter of the hole of the flange. Thus, the flange of the suspension is pushed and bent by the metal ball and the flange is pressed against the arm. That is, swaging (or caulking) is performed. With these procedures, the arm and the suspension are joined to each other.

In addition, a joining method other than fitting and joining is also known. For example, in Japanese Unexamined Patent Publication No. H7-178582, a method of joining a suspension and an arm by irradiation of a joining beam (by YAG laser) is disclosed.

SUMMARY

To increase a storage capacity of a magnetic disk device, it is necessary to increase the number of magnetic disks mounted to the device. However, there is a limit in a size (height) of the magnetic disk device. Thus, to increase the number of magnetic disks, it is necessary to make an arm, a suspension, and a joint part thin and to increase a space to install the magnetic disks.

In a case of fitting and joining disclosed in Japanese Unexamined Patent Publication No. H5-303855, a fitting range (joint part) becomes smaller and joint strength becomes lower as the arm and the suspension become thinner. That is, when the arm and the suspension become thinner, each fitting hole becomes shallower and the joint strength is decreased. Along with a decrease in the joint strength, a position of a magnetic head becomes unstable and accurate reading/writing of magnetic record becomes difficult. In the worst case, the suspension is detached from the arm and dropped onto the magnetic disk and the magnetic disk is damaged.

Also, in a case of joining by utilization of a laser disclosed in Japanese Unexamined Patent Publication No. H7-178582, an arm and a suspension are welded in a spot of a laser. Since a size of the spot is limited, a joint area (joint part) becomes small and adequate and reliable joint strength cannot be acquired. Also, when a space between suspensions becomes small along with an increase of the number of magnetic disks, it becomes difficult to accurately irradiate an intended position with a laser. As a result, adequate and reliable joint strength cannot be acquired.

In view of the circumstances mentioned above, it is an object of the present invention to provide a magnetic head device with strong joint strength in an arm and a suspension.

A magnetic head device according to an aspect of the present invention comprises an arm, a suspension overlapping with a leading end part of the arm, a slider located at a leading end part of the suspension, and a joint part located between the leading end part of the arm and the suspension, the joint part joining the arm and the suspension, while the joint part includes Sn (tin).

In an aspect of the present invention, a joint part includes an alloy containing Sn. The alloy may contain at least one kind selected from the group consisting of silver (Ag), copper (Cu), bismuth (Bi), indium (In), nickel (Ni), zinc (Zn), phosphorus (P), and gold (Au).

In an aspect of the present invention, a content of Sn in a joint part may be equal to or larger than 40 percent by mass and smaller than 100 percent by mass.

In an aspect of the present invention, a thickness of a joint part may be 2 to 50 μm.

In an aspect of the present invention, when an arm-side joint surface is defined as a surface of an arm which surface faces a suspension, a basis material of the arm may be exposed on a surface adjacent to the arm-side joint surface. Alternately, on the surface adjacent to the arm-side joint surface, a protective layer covering the basis material of the arm may be exposed and the protective layer may include Ni and P.

In an aspect of the present invention, when a suspension-side joint surface is defined as a surface of a suspension which surface faces an arm, a basis material of the suspension may be exposed on a surface adjacent to the suspension-side joint surface.

A magnetic head device according to an aspect of the present invention may comprise a carriage having a plurality of arms.

A magnetic head device according to an aspect of the present invention may be produced by a production method comprising a first step of covering one or both of a surface of an arm and a surface of a suspension with an alloy containing Sn or a Sn elementary substance, and a second step of making the surface of the arm and the surface of the suspension come into contact with each other after the first step and of forming a joint part.

In the first step, the alloy may be used and the alloy may contain at least one kind selected from the group consisting of Ag, Cu, Bi, In, Ni, Zn, P, and Au.

In the first step, one of the surface of the arm and that of the suspension may be covered with the alloy or a Sn elementary substance and the other surface may be covered with a metal having a melting point higher than that of the alloy or with metal having a melting point higher than that of the Sn elementary substance. The other surface may be covered with a Ni elementary substance or Ni including P. That is, the metal having a melting point higher than that of the alloy or the Sn elementary substance may be Ni or Ni including P.

According to an aspect of the present invention, a magnetic head device with high joint strength in an arm and a suspension is provided.

DETAILED DESCRIPTION

Figure 1:
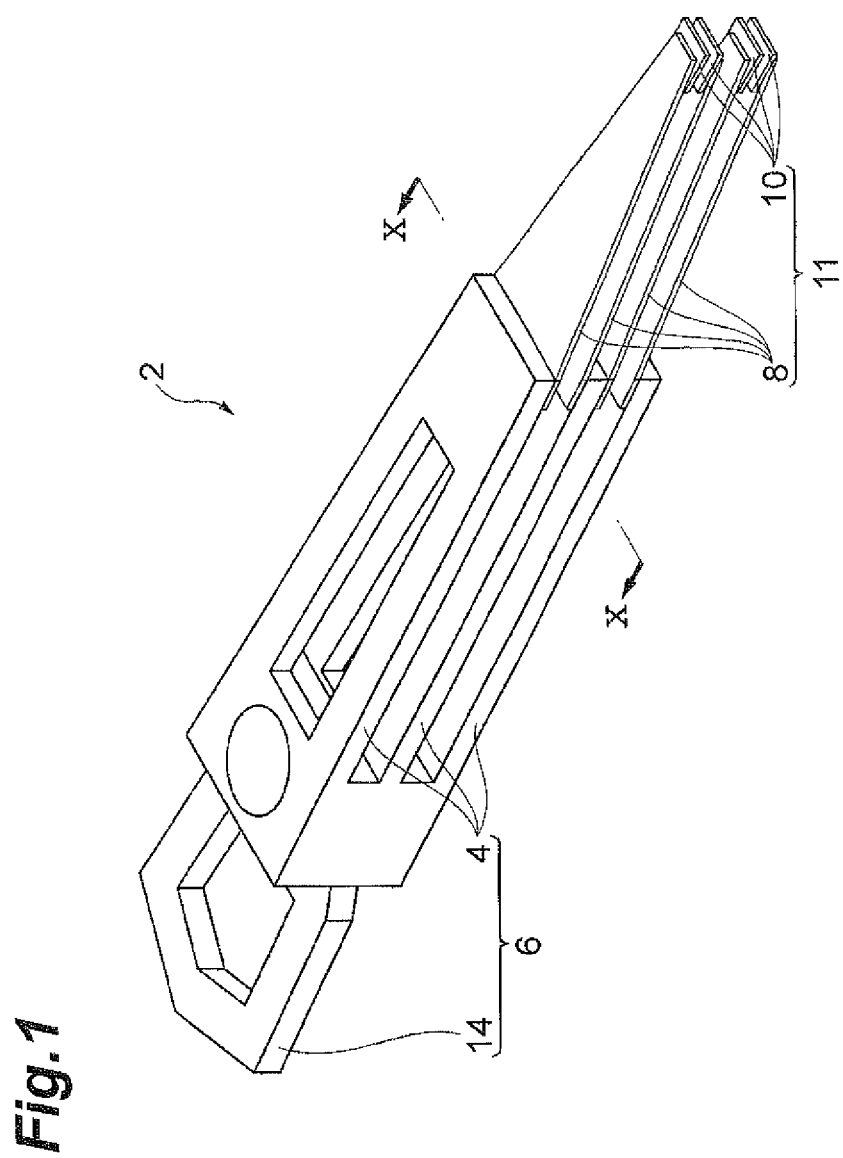
FIG. 1 is a schematic perspective view of a magnetic head device according to an embodiment of the present invention.
Figure 2:
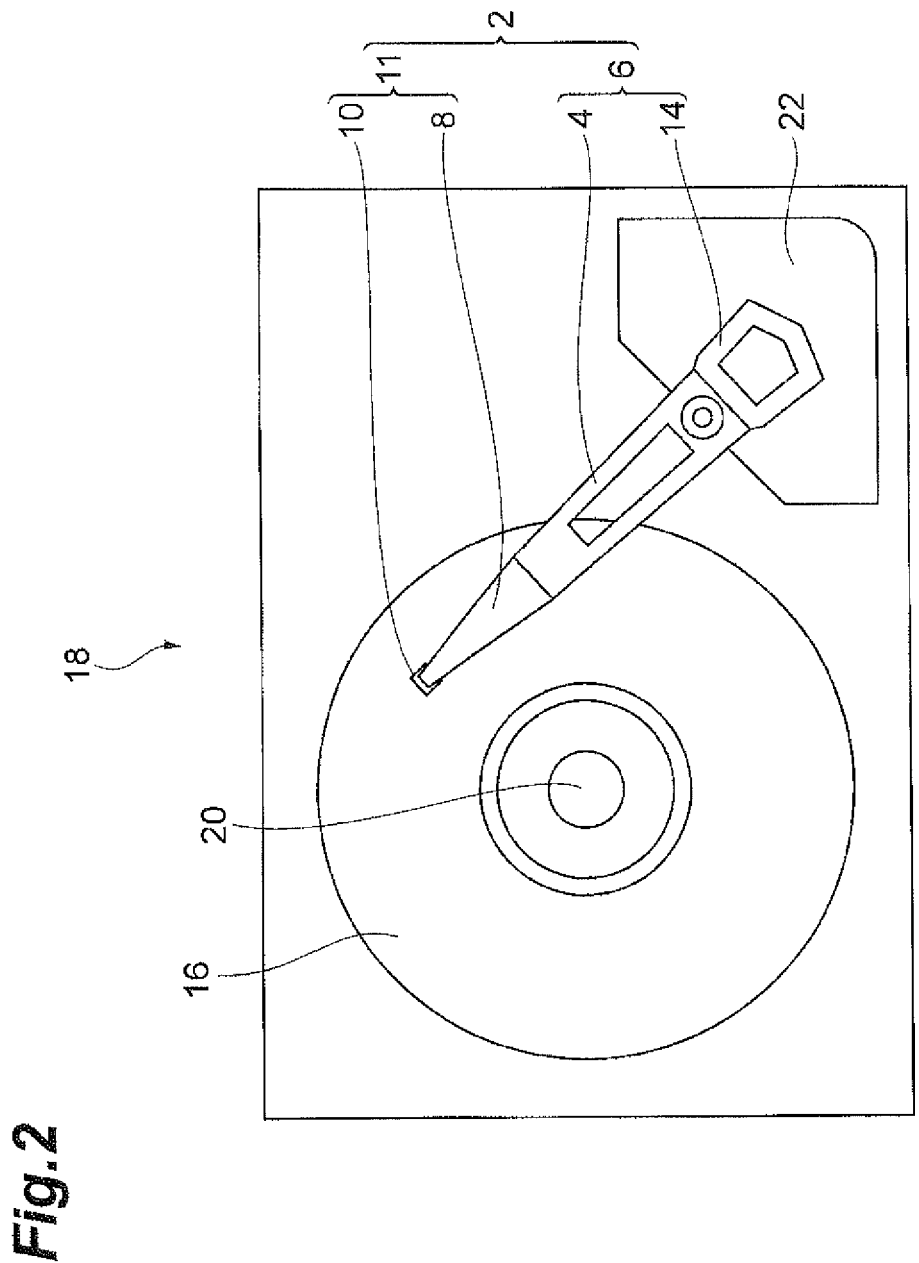
FIG. 2 is a schematic top view of a magnetic disk device comprising a magnetic head device according to an embodiment of the present invention.
Figure 3:
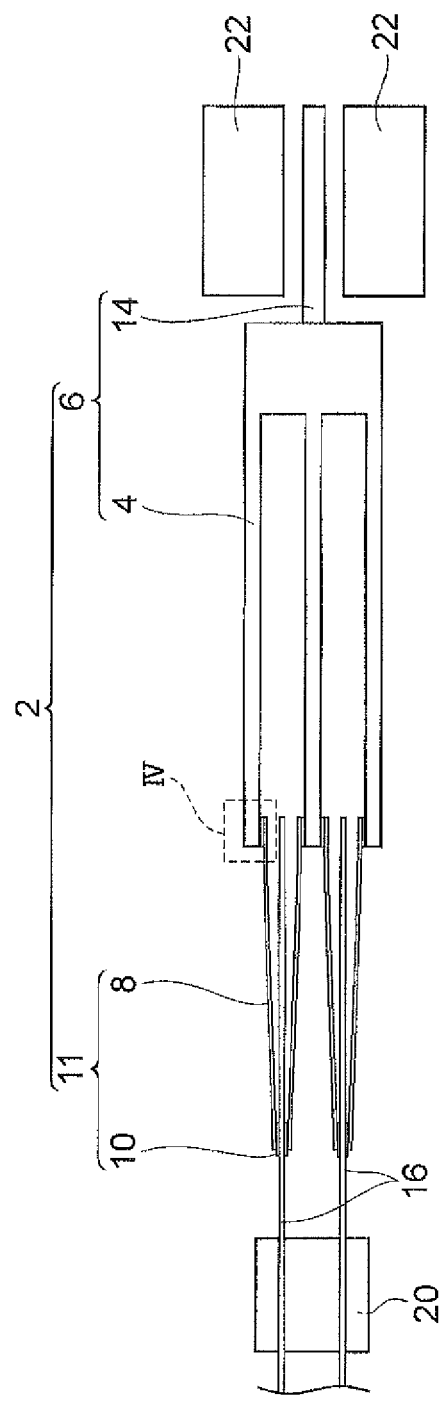
FIG. 3 is a schematic side view of the magnetic disk device illustrated in FIG. 2.
Figure 4:
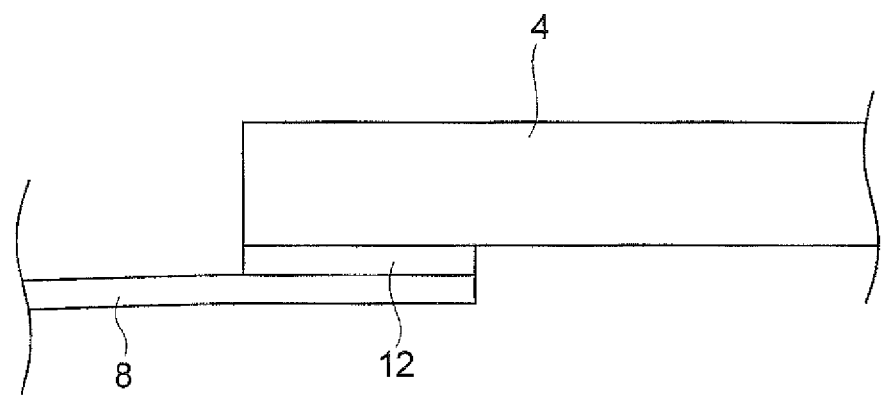
FIG. 4 is a schematic enlarged view of a joint part of an arm and a suspension included in the magnetic head device illustrated in FIG. 3.

In the following, a preferred embodiment of the present invention will be described with reference to the drawings. In the drawings, the same reference sign is assigned to the same or similar configurations. The present invention is not limited to the following embodiment.

A magnetic head device according to the present embodiment is a head stack assembly (HSA). As illustrated in FIG. 1, FIG. 2, FIG. 3, and FIG. 4, a HSA 2 comprises a carriage 6 having a plurality of arms 4, suspensions 8 respectively overlapping with leading end parts of the arms 4, sliders 10 respectively located at the leading end parts of the suspensions 8, a joint part 12 that is located between the leading end part of each arm 4 and each suspension 8 and that joins the arm 4 and the suspension 8. In other words, the HSA 2 comprises the carriage 6 having the plurality of arms 4, head gimbal assemblies (HGA 11) respectively joined to the leading end parts of the arms 4, and the joint part 12 joining each arm 4 and each HGA 11. Each of the arms 4 and suspensions 8 may be flat or plate-shaped. Each of the arms 4 and suspensions 8 may be extended in a predetermined direction. That is, each of the arms 4 and suspensions 8 may be elongated. Each of the suspensions 8 may overlap only with one surface of a leading end part of one arm 4. One suspension 8 may overlap with a surface of a leading end part of one arm 4 and another suspension 8 may overlap with a rear surface of the leading end part of the arm 4. That is, a leading end part of one arm 4 may be sandwiched by a pair of suspensions 8. A magnetic head (such as thin-film magnetic head) is embedded in each slider 10. The plurality of arms 4 and HGAs 11 are overlapped with each other in the same direction with predetermined intervals. For convenience of description, three arms 4 are illustrated. However, the number of arms 4 is not limited. For convenience of description, four suspensions 8 and four sliders 10 are illustrated. However, the number of suspensions 8 and that of sliders 10 are not limited.

The HSA 2 is mounted in a magnetic disk (HDD) comprising a plurality of magnetic disks 16. The plurality of magnetic disks 16 are attached to a spindle motor 20 and overlapped with each other with predetermined intervals. Each of the magnetic disks 16 may be arranged between a pair of HGAs 11. Each slider 10 located at a leading end part of each HGA 11 faces the magnetic disk 16. A part of the carriage 6 which part is located on an opposite side of each arm 4 is a coil part 14. The coil part 14 and a pair of permanent magnets 22 which sandwich and face the coil part 14 constitute a voice coil motor (VCM). For convenience of description, two magnetic disks 16 are illustrated. However, the number of magnetic disks 16 is not limited.

Each joint part 12 includes Sn. Each joint part 12 may include a Sn elementary substance. The joint part 12 may consist of a Sn elementary substance. Each joint part 12 may include an alloy containing Sn. Each joint part 12 may consist of an alloy containing Sn. The alloy containing Sn may contain at least one kind selected from the group consisting of Ag, Cu, Bi, In, Ni, Zn, P, and Au. In the following, the alloy containing Sn may be referred to as an "Sn-based alloy."

A substance composing the arms 4 (basis material of arm 4) is not specifically limited but may be, for example, aluminum (Al). A part or all of a surface of each arm 4 may be constituted by a protective layer covering the basis material of the arm 4. That is, the arm 4 may have a substrate (basis material) consisting of Al or the like, and a protective layer covering a part or all of a surface of the substrate (basis material). A joint part 12 may be located on the protective layer constituting the surface of the arm 4. The protective layer may include Ni and P. The protective layer may consist only of Ni—P (Ni including phosphorus). A substance composing the whole carriage 6 (except for coil part 14) may be a substance identical to that included in the arms 4. A part or all of a surface of the carriage 6 (except for coil part 14) may include the protective layer. A substance composing the suspensions 8 (basis material of suspension 8) is not specifically limited but may be, for example, stainless steel (SUS).

The HSA 2 according to the present embodiment may be produced by a production method comprising the undermentioned first step and a second step following the first step.

In the first step, at least one of a surface of an arm 4 and a surface of a suspension 8 is covered with a Sn-based alloy or a Sn elementary substance. In other words, in the first step, a film including Sn is formed at least on one of the surface of the arm 4 and that of the suspension 8. In the first step, a part or all of the surface of the arm 4 may be covered with the film including Sn. In the first step, a part or all of the surface of the suspension 8 may be covered with the film including Sn. In the following, a film formed on the surface of the arm 4 in the first step will be referred to as an "arm film." Also, a film formed on the surface of the suspensions 8 in the first step will be referred to as a "suspension film." Composition of a joint part 12 can be controlled, for example, by adjustment of composition of the arm film or the suspension film. At least one of the arm film and the suspension film includes Sn. When there is an arm film including Sn, a suspension film is not necessarily included. When there is a suspension film including Sn, an arm film may be absent. In the first step, the arm film may be formed on the protective layer included in the surfaces of the arm 4.

A method of forming the arm film and the suspension film may be, for example, plating, sputtering, or chemical vapor deposition (CVD). The plating may be either one of electrolytic plating or electroless plating. According to these forming methods, it is possible to adjust the composition and a thickness of each of the arm film and the suspension film. Only a part of a surface of an arm 4 may be exposed and the other part thereof may be covered by a masking process performed before the first step. In the first step after the masking process, the arm film may be formed only on the exposed part on the surface of the arm 4. Only a part of a surface of a suspension 8 may be exposed and the other part thereof may be covered by a masking process performed before the first step. In the first step after the masking process, the suspension film may be formed only on the exposed part on the surface of the suspension 8. In the masking process, an arm 4 or a suspension 8 may be covered with a resin film. That is, a mask may be a resin film.

In the second step, a surface of an arm 4 and a surface of a suspension 8 are made to come into contact with each other and the two surfaces are joined, whereby a joint part 12 is formed. A surface of the arm 4 which surface faces the suspension 8 will be referred to as an "arm-side joint surface." The arm-side joint surface may be also referred to as a joined surface on a side of the arm. A surface of the suspension 8 which surface faces the arm 4 will be referred to as a "suspension-side joint surface." The suspension-side joint surface may be also referred to as a joined surface on a side of the suspension. In the second step, the arm-side joint surface and the suspension-side joint surface are made to come into contact with each other and a joint part 12 is formed. That is, the joint part 12 joins the arm-side joint surface and the suspension-side joint surface. In a case of performing the masking process before the first step, a process of removing a mask from the arm 4 or the suspension 8 may be performed after the second step.

A joining method used in the second step is not specifically limited. For example, the arm-side joint surface and the suspension-side joint surface may be made to come into contact with each other and may be heated. That is, the arm-side joint surface and the suspension-side joint surface are adhered to each other and at least one/or both of the arm film and the suspension film is/are heated and melted. As a result, the joint part 12 is formed form at least one or both of the arm film and the suspension film. That is, the arm-side joint surface and the suspension-side joint surface are welded. The heating method may be, for example, an atmosphere heating method such as formic acid reflow. In a case of forming the joint part 12 by heating in the second step, the arm-side joint surface and the suspension-side joint surface may be heated, for example, at 150 to 450° C. By the heating in this temperature range, the joint part 12 is formed easily and joint strength in the arm 4 and the suspension 8 is improved easily. The joint part 12 may be formed by welding of the arm-side joint surface and the suspension-side joint surface by laser welding. The joint part 12 may be formed by a non-heating method such as an ultrasonic joining method. In the ultrasonic joining method, a dust, an oxide film, or the like on the arm-side joint surface and the suspension-side joint surface is removed by an ultrasonic wave and each joint surface is activated. The arm-side joint surface and the suspension-side joint surface are chemically joined. Note that it becomes more difficult to irradiate each joint surface with a laser when an interval between suspensions 8 becomes smaller. However, when the heating method or the ultrasonic joining method is used, heat or an ultrasonic wave is easily transmitted to each joint surface in a uniform manner regardless of an interval between the suspensions 8. Thus, unevenness or a variation in joint strength between a plurality of joint parts 12 is easily suppressed.

As described above, in the present embodiment, a joint part 12 including Sn chemically joins an arm 4 and a suspension 8. Thus, according to the present embodiment, joint strength in the arm 4 and the suspension 8 is improved compared to a case where a mechanical joining method such as fitting and joining in a related art is used. Also, in the present embodiment, the joint part 12 can be formed by surface contact. Thus, it is not necessary to make the arm 4 and the suspension 8 thick to form a fitting hole. That is, in the present embodiment, even when the arm 4 and the suspension 8 are too thin to perform fitting and joining, joint strength is hardly weakened. Thus, according to the HSA 2 of the present embodiment, it is possible to make the arm 4 and the suspension 8 thin and to increase the number of magnetic disks 16 while securing the joint strength. As a result, it is possible to realize a magnetic disk device 18 with high reliability and a large capacity compared to a related art.

A content of Sn in the joint part 12 may be, for example, equal to or larger than 40 percent by mass and smaller than 100 percent by mass. In a case where the content of Sn is equal to or larger than 40 percent by mass, joint strength is easily improved. The content of Sn in the joint part 12 is controlled freely, for example, by an adjustment of a content of Sn in the arm film or the suspension film formed in the first step.

A thickness of the joint part 12 may be, for example, 2 to 50 µm or 5 to 30 µm. The thickness of the joint part 12 may be also referred to as a space between the arm 4 and the suspension 8 joined via the joint part 12. The thickness of the joint part 12 is controlled freely, for example, by an adjustment of a thickness of the arm film or the suspension film formed in the first step. By control of making the joint part 12 equal to or thicker than 2 µm, joint strength is improved easily. By making the joint part 12 equal to or thinner than 50 µm, melting and flowing out (that is, bleeding) of a component(s) of the arm film or the suspension film in the second step is easily suppressed. As a result, contamination of a different member due to bleeding is easily suppressed and a decrease in a function of a different member due to the contamination is easily suppressed.

The thickness of the suspension 8 may be, for example, 0.05 to 0.3 mm. The thickness of the arm 4 may be, for example, 0.3 to 1.0 mm.

A Sn-based alloy used in the first step is, for example, solder or a braze material. The Sn-based alloy may contain at least one kind selected from the group consisting of Ag, Cu, Bi, In, Ni, Zn, P, and Au in addition to Sn. By utilization of the Sn-based alloy containing these elements, a joint part 12 is formed easily in the second step and joint strength is easily improved. Note that when one of the arm film and the suspension film includes Sn, it is not necessary for the other film to include Sn. For example, when one of the arm film and the suspension film includes Sn, the other film may be a film consisting of at least one kind selected from the group consisting of Ag, Cu, Bi, In, Ni, Zn, P, and Au. That is, the other film may be a film consisting of an element other than Sn. The arm film may be constituted by two overlapped films. One of the films includes Sn and the other does not necessarily include Sn. Similarly, the suspension film may be constituted by two overlapped films.

In the first step, one of a surface of an arm and a surface of a suspension may be covered with a Sn-based alloy or a Sn elementary substance and the other surface may be covered with metal having a melting point higher than that of the Sn-based alloy or metal having a melting point higher than that of the Sn elementary substance. In a case where such a first step is performed, excessive melting or bleeding of each joint surface in the second step is suppressed. Thus, the joint part 12 easily becomes thick. The metal having a melting point higher than the Sn-based alloy or the Sn elementary substance is, for example, a Ni elementary substance or Ni including P. Thus, in the first step, one joint surface may be covered with a film consisting of the Sn-based alloy or the Sn elementary substance and the other joint surface may be covered with a film consisting of the Ni elementary substance or a film consisting of Ni including P. The film consisting of Ni including P can be formed, for example, by an electroless nickel plating solution including a phosphorous compound. The phosphorous compound is, for example, hypophosphite such as sodium hypophosphite.

Figure 5A:
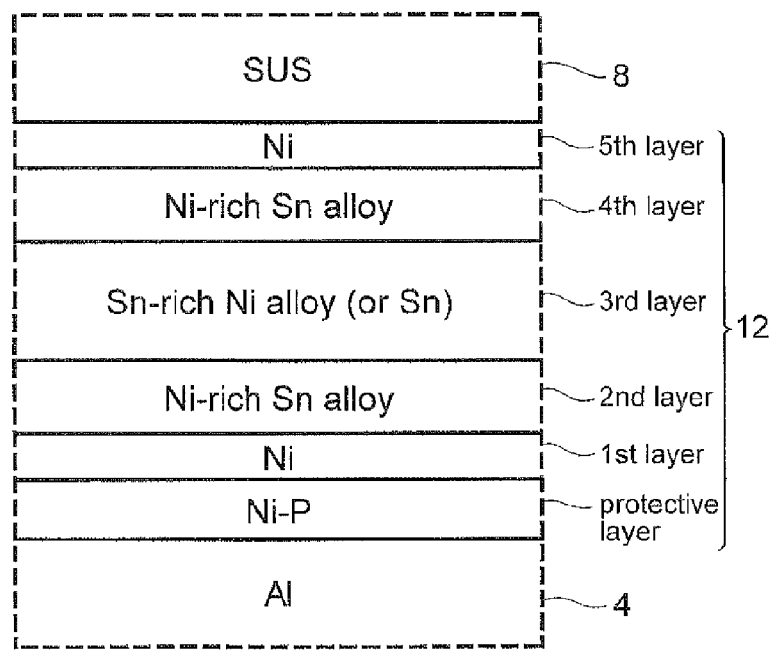
FIG. 5A is a schematic cross sectional view of an example of a joint part included in a magnetic head device according to an embodiment of the present invention.

A joint part 12 may have a plurality of layers. For example, as illustrated in FIG. 5A, the joint part 12 may have a protective layer (Ni—P layer), a first (1st) layer, a second (2nd) layer, a third (3rd) layer, a fourth (4th) layer, and a fifth (5th) layer. In FIG. 5A, on a surface of an arm 4 consisting of Al, the Ni—P layer is formed. The 1st layer consists of Ni. The 1st layer covers the Ni—P layer. The 2nd layer consists of a Ni-rich Sn alloy (NiSn). The 2nd layer covers the 1st layer. The 3rd layer consists of a Sn-rich Ni alloy (SnNi). The 3rd layer may consist only of Sn. The 3rd layer covers the 2nd layer. The 4th layer consists of a Ni-rich Sn alloy (NiSn). The 4th layer covers the 3rd layer. The 5th layer consists of Ni. The 5th layer covers the 4th layer. The 5th layer is in contact with a surface of a suspension 8 consisting of SUS. In the joint part 12 illustrated in FIG. 5A, "Ni-rich" means that a content of Ni (in percent by mass) in the 2nd layer or the 4th layer is larger than a content of Ni in the 3rd layer. In the joint part 12 illustrated in FIG. 5A, "Sn-rich" means that a content of Sn in the 3rd layer is larger than a content of Sn in the 2nd layer or the 4th layer. In a case of forming the joint part 12 illustrated in FIG. 5A, a Ni film is formed on each of an arm-side joint surface Ni—P layer) and a suspension-side joint surface in a first step. Then, a Sn film is formed on at least one of the two Ni films. Sn films may be formed on both of the Ni films. By heating these joint surfaces in the following second step, the joint part 12 illustrated in FIG. 5A is obtained.

Figure 5B:
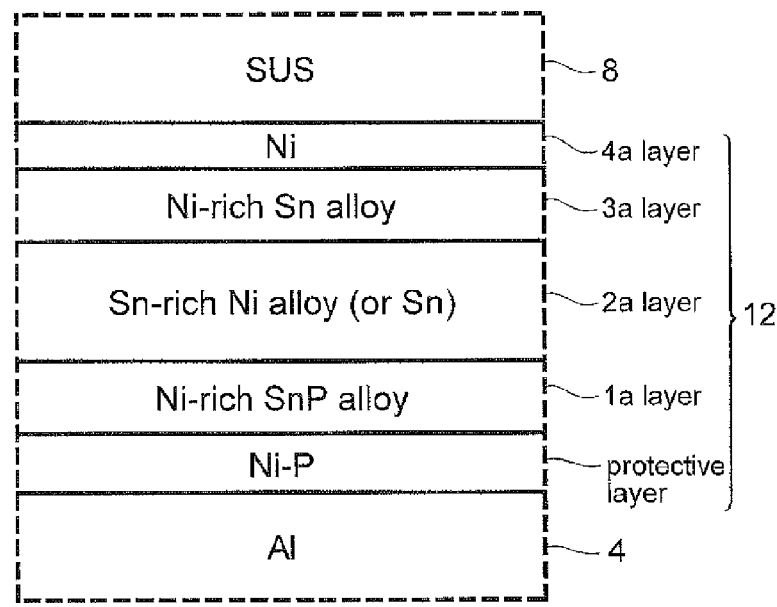
FIG. 5B is a schematic cross sectional view of a different example of a joint part included in a magnetic head device according to an embodiment of the present invention.

As illustrated in FIG. 5B, a joint part 12 may have a protective layer (Ni—P layer), a 1a layer, a 2a layer, a 3a layer, and a 4a layer. In FIG. 5B, on a surface of an arm 4 consisting of Al, the Ni—P layer is formed. The 1a layer consists of a Ni-rich SnP alloy (NiSnP). The 1a layer covers the Ni—P layer. The 2a layer consists of a Sn-rich Ni alloy (SnNi). The 2a layer may consist only of Sn. The 2a layer covers the 1a layer. The 3a layer consists of a Ni-rich Sn alloy (NiSn). The 3a layer covers the 2a layer. The 4a layer consists of Ni. The 4a layer covers the 3a layer. The 4a layer is in contact with a surface of a suspension 8 consisting of SUS. In the joint part 12 illustrated in FIG. 5B, "Ni-rich" means that a content of Ni (in percent by mass) in the 1a layer or the 3a layer is larger than a content of Ni in the 2a layer. In the joint part 12 illustrated in FIG. 5B, "Sn-rich" means that a content of Sn in the 2a layer is larger than a content of Sn in the 1a layer or the 3a layer. In a case of forming the joint part 12 illustrated in FIG. 5B, a Ni film is formed on a suspension-side joint surface in a first step. Then, a Sn film is formed at least on an arm-side joint surface (Ni—P layer) or the suspension-side joint surface (Ni film). The Sn film may be formed on each of the arm-side joint surface (Ni—P layer) and the suspension-side joint surface (Ni film). By heating these joint surfaces in the following second step, the joint part 12 illustrated in FIG. 5B is obtained.

In the first step, at least one of the arm-side joint surface and the suspension-side joint surface may be covered with a Sn-based alloy or a Sn elementary substance. That is, only the arm-side joint surface among surfaces of the arm 4 may be covered with a film including Sn. Only the suspension-side joint surface among surfaces of the suspension 8 may be covered with a film including Sn. Each of the arm-side joint surface and the suspension-side joint surface may be covered with the film including Sn. In the first step, one of the arm-side joint surface and the suspension-side joint surface may be covered with a Sn-based alloy or a Sn elementary substance and the other joint surface may be covered with metal having a melting point higher than that of the Sn-based alloy or the Sn elementary substance.

Figure 6A:
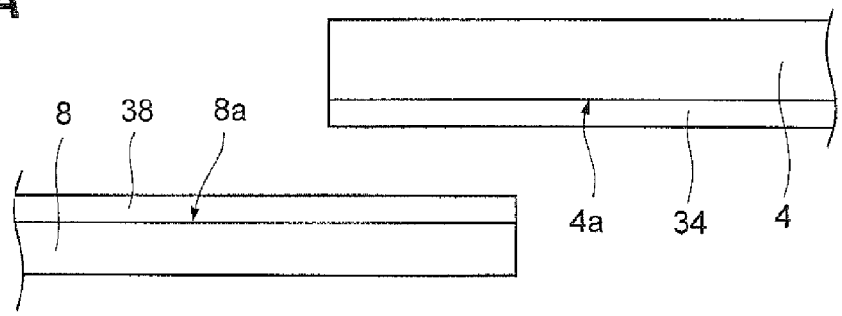
FIG. 6A is a schematic view illustrating an example of a first step in a production method of a magnetic head device according to an embodiment of the present invention.
Figure 6B:
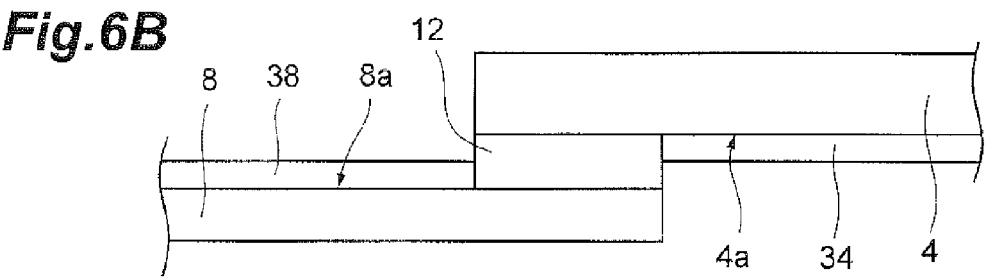
FIG. 6B is a schematic view of an arm, a suspension, and a joint part included in the magnetic head device produced in the first step illustrated in FIG. 6A.

As illustrated in FIG. 6A, in a first step, a whole arm-side joint surface 4a may be covered with an arm film 34. In the first step, a whole suspension-side joint surface 8a may be covered with a suspension film 38. In a case where a first step illustrated in FIG. 6A is performed, a part of the arm film 34 becomes a joint part 12 and the other part of the arm film 34 remains on a surface of an arm 4 (arm-side joint surface 4a), as illustrated in FIG. 6B. Similarly, a part of the suspension film 38 becomes the joint part 12 and the other part of the suspension film 38 remains on a surface of a suspension 8 (suspension-side joint surface 8a).

Figure 6C:
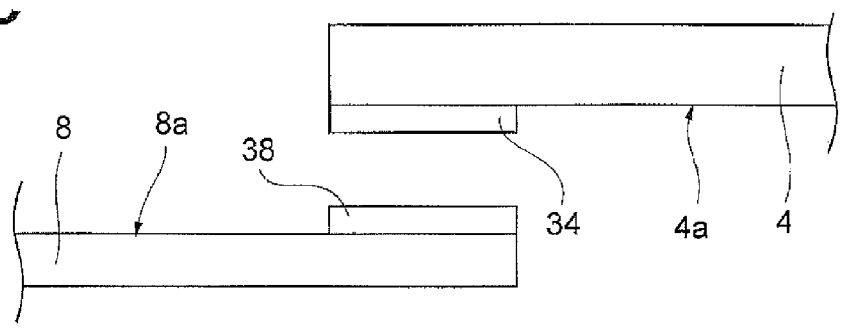
FIG. 6C is a schematic view illustrating a different example of a first step in a production method of a magnetic head device according to an embodiment of the present invention.
Figure 6D:
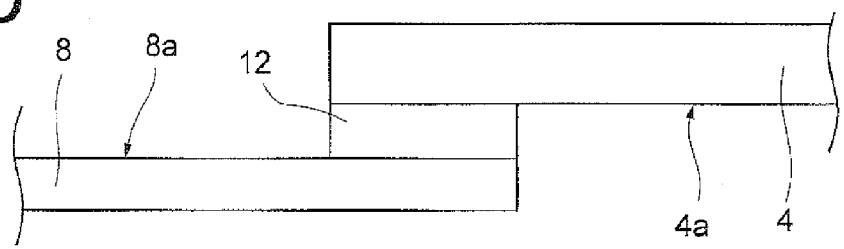
FIG. 6D is a schematic view illustrating an arm, a suspension, and a joint part included in the magnetic head device produced in the first step illustrated in FIG. 6C.

In a first step, only a part of an arm-side joint surface 4a may be covered with an arm film 34. For example, as illustrated in FIG. 6C, only a leading end part of the arm-side joint surface 4a which part overlaps with a suspension 8 may be covered with the arm film 34. In the first step, a part of a suspension-side joint surface 8a may be covered with a suspension film 38. For example, as illustrated in FIG. 6C, only a part of the suspension-side joint surface 8a which part overlaps with the leading end part of the arm 4 may be covered with the suspension film 38. In a case of performing the first step illustrated in FIG. 6C, almost all of the arm film 34 and the suspension film 38 become a joint part 12, as illustrated in FIG. 6D.

In a case of welding the arm-side joint surface 4a and the suspension-side joint surface 8a in a second step, the arm film 34 or the suspension film 38 located between the both joint surfaces is melted. In the following, the melted arm film 34 or suspension film 38 will be referred to as a melted metal. The melted metal is solidified and forms the joint part 12. A part of the melted metal may flow and protrude from between the joint surfaces to form a fillet. The fillet has a chemical composition substantially identical to that of the joint part 12 and means a part which protrudes from between the arm-side joint surface 4a and the suspension-side joint surface 8a. The fillet is a kind of a burr and impairs a size/shape accuracy of a HSA 2 (magnetic head device). For example, in production of the HSA 2, a positioning hole may be formed in each of the arm 4 and the suspension 8 for alignment of positions of the arm 4 and the suspension 8. In a case where a fillet is formed in these positioning holes, accuracy of a size of the positioning holes is impaired and it becomes difficult to align the positions of the arm 4 and the suspension 8 accurately. The smaller a magnetic disk device 18 becomes, the more accuracy of the size/shape of the HSA 2 is to be improved by suppression of forming of the fillet. That is, the smaller the magnetic disk device 18 is, the smaller the fillet needs to be. Also, the fillet may fall out of the HSA 2 and may damage a surface of the magnetic disk 16.

In the following, a fillet will be described in detail with reference to FIG. 7A, FIG. 7B, FIG. 7C, FIG. 7D, FIG. 8A, FIG. 8B, FIG. 8C and FIG. 8D. FIG. 7A, FIG. 7C, FIG. 8A, and FIG. 8C are views illustrating arms 4 and suspensions 8 processed in different first steps. Each of FIG. 7A, FIG. 7C, FIG. 8A, and FIG. 8C is a view illustrating a cross section of an arm 4 which section is vertical to an arm-side joint surface 4a and a cross section of a suspension 8 which section is vertical to a suspension-side joint surface 8a. FIG. 7B, FIG. 7D, FIG. 8B, and FIG. 8D are schematic cross sectional views of different HSAs. Each of the cross sectional views corresponds to a cross section in an XX-line direction in FIG. 1.

Figure 7A:
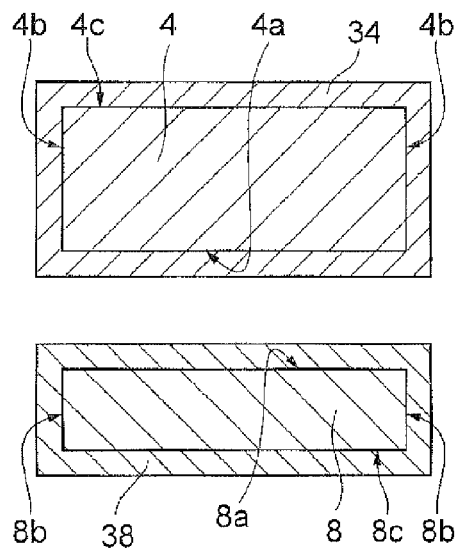
FIG. 7A is a schematic view illustrating a different example of a first step in a production method of a magnetic head device according to an embodiment of the present invention.
Figure 7B:
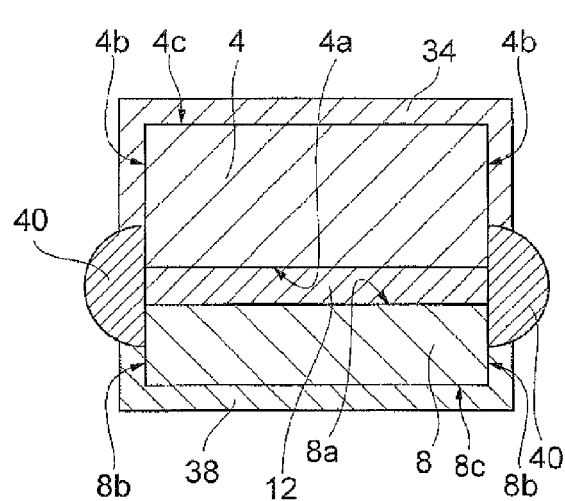
FIG. 7B is a schematic cross sectional view of an arm, a suspension, and a joint part included in the magnetic head device produced in the first step illustrated in FIG. 7A.

As illustrated in FIG. 7A, in a case where a whole surface of an arm 4 is covered with an arm film 34 and a whole surface of a suspension 8 is covered with a suspension film 38 in a first step, a fillet 40 is easily increased in a second step, as illustrated in FIG. 7B. It is because melted metal is easily spread to a part other than a joint part 12 through surfaces of the arm film 34 and suspension film 38 having wettability (affinity to melted metal).

Figure 7C:
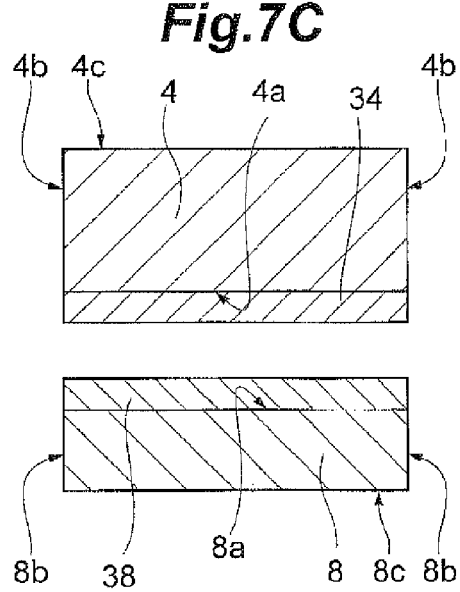
FIG. 7C is a schematic view illustrating a different example of a first step in a production method of a magnetic head device according to an embodiment of the present invention.
Figure 7D:
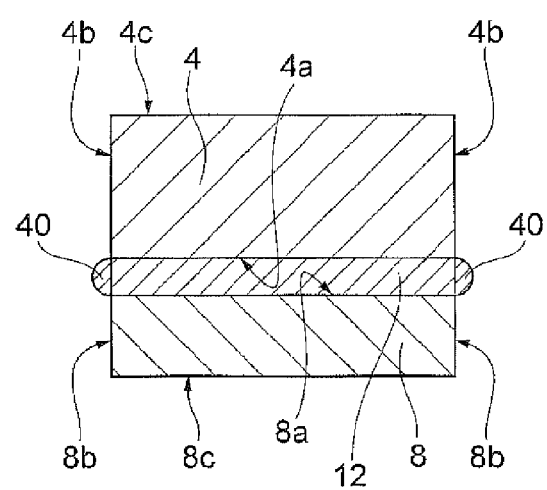
FIG. 7D is a schematic cross sectional view of an arm, a suspension, and a joint part included in the magnetic head device produced in the first step illustrated in FIG. 7C.

Since having composition different from that of the melted metal, a surface of the arm 4 (such as Al) has low wettability compared to the arm film 34. In a case where the surface of the arm 4 is covered with a protective layer consisting of Ni including phosphorus (Ni—P), the protective layer has composition different from that of the melted metal. Thus, the protective layer has low wettability compared to both of the surfaces of the arm film 34 and the arm 4. Since having composition different from that of the melted metal, a surface of the suspension 8 (such as stainless steel or passivation film unique to stainless steel) has low wettability compared to the suspension film 38. By using a difference in the wettability, it is possible to control a volume of the fillet 40. For example, as illustrated in FIG. 7C, a basis material of an arm 4 is exposed on a surface (side surface 4b) adjacent to an arm-side joint surface 4a in a first step. Also, in the first step, a basis material of a suspension 8 is exposed on a surface (side surface 8b) adjacent to a suspension-side joint surface 8a. In other words, in the first step, only the arm-side joint surface 4a is covered with an arm film 34 and only the suspension-side joint surface 8a is covered with a suspension film 38. That is, in the first step, a part where the arm film 34 and the suspension film 38 are formed is limited and a part of each basis material with low wettability is exposed intentionally. As a result, in a second step, a melted metal is hardly spread to a part (basis material) other than a joint part 12. Thus, as illustrated in FIG. 7D, a volume of a fillet 40 is suppressed. When a HSA is finished, the basis material of the arm 4 is exposed on the surface (side surface 4b) adjacent to the arm-side joint surface 4a and the basis material of the suspension 8 is exposed on the surface (side surface 8b) adjacent to the suspension-side joint surface 8a. On a part or a whole of the surface (side surface 4b) adjacent to the arm-side joint surface 4a, the basis material of the arm 4 may be exposed. On a part or a whole of the surface (side surface 8b) adjacent to the suspension-side joint surface 8a, the basis material of the suspension 8 may be exposed. Of course, the fillet 40 may be absent.

In a modified example (variation) of the first step illustrated in FIG. 7C, a protective layer covering a basis material of an arm 4 may be exposed on a surface (side surface 4b) adjacent to an arm-side joint surface 4a. The protective layer only needs to include Ni and P. Similarly to the basis material of the arm 4, wettability of the protective layer is low. Thus, according to a principle similar to the above, a volume of a fillet 40 is suppressed. When a HSA is finished, the protective layer covering the basis material of the arm 4 may be exposed on the surface (side surface 4b) adjacent to the arm-side joint surface 4a.

In a modified example of the first step illustrated in FIG. 7C, a suspension-side joint surface 8a and a rear surface 8c of the suspension-side joint surface 8a may be covered with a suspension film 38 and a basis material of a suspension 8 may be exposed on a side surface 8b located between the suspension-side joint surface 8a and the rear surface 8c. For example, when a plate material is punched and formed by a pressing machine after a whole surface of the plate material is covered with the suspension film 38 (such as plating), a thin plate-like suspension 8 is obtained, both surfaces thereof being covered by plating and a basis material of the plate material being exposed on a cross section thereof. When a HSA is finished, the rear surface 8c of the suspension-side joint surface 8a may be covered with the suspension film 38 (such as Sn-based alloy or Sn elementary substance). The basis material of the suspension 8 may be exposed on the side surface 8b located between the suspension-side joint surface 8a and the rear surface 8c.

In a modified example of the first step illustrated in FIG. 7C, an arm-side joint surface 4a and a rear surface 4c of an arm-side joint surface 4a may be covered with an arm film 34 and a basis material of an arm 4 may be exposed on a side surface 4b located between the arm-side joint surface 4a and the rear surface 4c. When a HSA is finished, the rear surface 4c of the arm-side joint surface 4a may be covered with the arm film 34 (such as Sn-based alloy or Sn elementary substance). The basis material of the arm 4 may be exposed on the side surface 4b located between the arm-side joint surface 4a and the rear surface 4c.

Figure 8A:
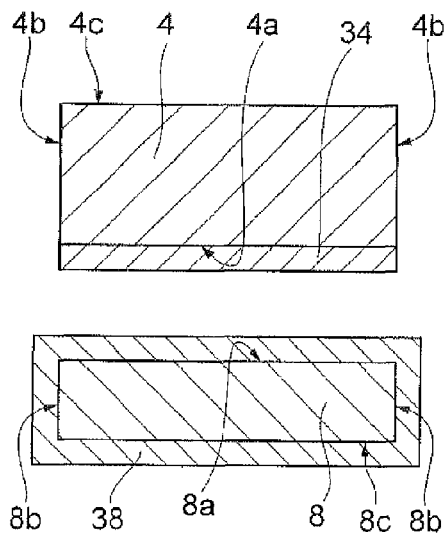
FIG. 8A is a schematic view illustrating a first step in a production method of a magnetic head device according to an embodiment of the present invention.
Figure 8B:
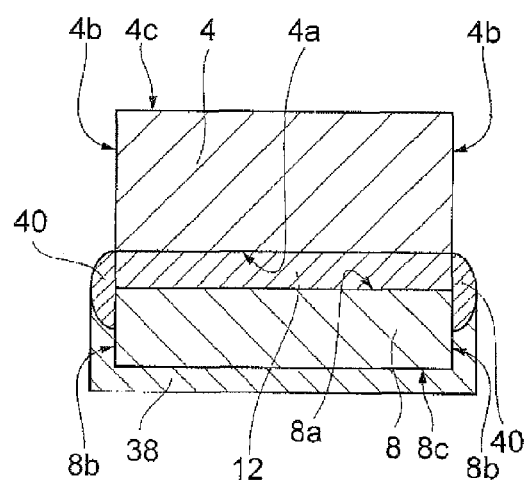
FIG. 8B is a schematic cross sectional view of an arm, a suspension, and a joint part included in the magnetic head device produced in the first step illustrated in FIG. 8A.

As illustrated in FIG. 8A, in a first step, only an arm-side joint surface 4a may be covered with an arm film 34 and a whole surface of a suspension 8 may be covered a the suspension film 38. In the following second step, a melted metal is spread to the surface of the suspension 8 through a surface of the suspension film 38 but is hardly spread to a surface of an arm 4 (basis material of arm 4). Thus, as illustrated in FIG. 8B, a volume of a fillet 40 is suppressed.

Figure 8C:
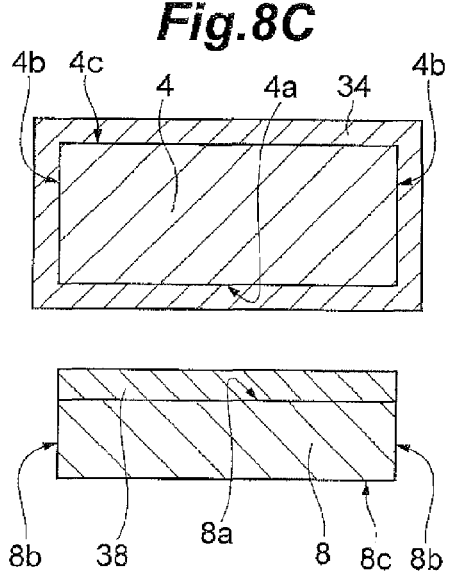
FIG. 8C is a schematic view illustrating a first step in a production method of a magnetic head device according to an embodiment of the present invention.
Figure 8D:
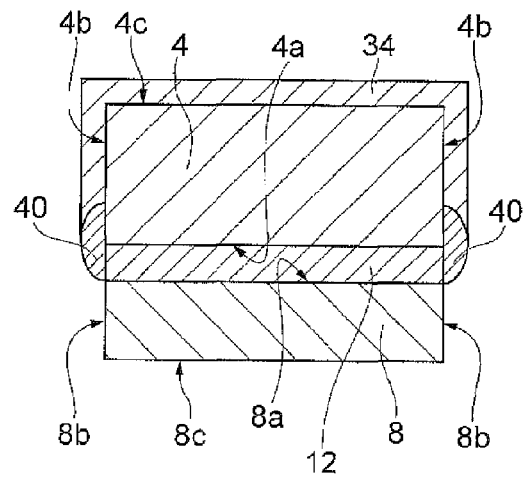
FIG. 8D is a schematic cross sectional view of an arm, a suspension, and a joint part included in the magnetic head device produced in the first step illustrated in FIG. 8C.

As illustrated in FIG. 8C, in a first step, a whole surface of an arm 4 may be covered with an arm film 34 and only a suspension-side joint surface 8a may be covered with a suspension film 38. In the following second step, a melted metal is spread to the surface of the arm 4 through a surface of the arm film 34 but is hardly spread to a surface of the suspension 8 (basis material of suspension 8). Thus, as illustrated in FIG. 8D, a volume of a fillet 40 is suppressed.

In the above, a magnetic head device (HSA 2) according to an embodiment of the present invention has been described. However, the present invention is not limited to the above embodiment. For example, a magnetic head device according to a different embodiment of the present invention may be a head arm assembly (HAA) comprising an arm 4, a suspension 8 overlapping with a leading end part of the arm 4, a slider 10 located at a leading end part of the suspension 8, and a joint part 12 that is located between the leading end part of the arm 4 and the suspension 8 and that joins the arm 4 and the suspension 8, the joint part 12 including Sn.

The suspension 8 may have a spacer, a load beam, and a flexure. That is, the suspension 8 may be configured by a spacer, a load beam, and a flexure. The spacer may overlap with a leading end part of the arm 4 and the joint part 12 including Sn may be located between the leading end part of the arm 4 and the spacer. That is, the joint part 12 may join the arm 4 and the spacer. One leading end part of the load beam may be fixed to the spacer and the flexure may be provided in the other leading end part of the load beam. The slider 10 may be provided on a surface of the flexure.

EXAMPLES

In the following, contents of the present invention will be described in detail with reference to Examples and Comparative Examples. However, the present invention is not limited to the following Examples.

Example A1

An arm for an E-block which arm consists of an aluminum-base material is manufactured. A whole surface of the arm is previously covered with a Ni—P film (protective layer). A thickness of the Ni—P film is 0.5 μm. Also, a suspension consisting of SUS is manufactured. A thickness of the arm is 0.5 mm. A thickness of the suspension is 0.1 mm.

[First Step]
By an electrolytic plating method, a whole surface of the arm is covered with a Ni film (film consisting of Ni). A thickness of the Ni film is adjusted to 0.2 μm. Subsequently, a whole Ni film formed on the surface of the arm is covered with a Sn film (film consisting of Sn) by the electrolytic plating method. A thickness of the Sn film is adjusted to 10 μm.

By the electrolytic plating method, a whole surface of the suspension is covered with a Ni film. A thickness of the Ni film is adjusted to 0.2 μm. Subsequently, a whole Ni film formed on the surface of the suspension is covered with a Sn film by the electrolytic plating method. A thickness of the Sn film is adjusted to 10 μm.

[Second Step]
Subsequently, a surface (Sn film) of a leading end part of the arm is overlapped with the surface (Sn film) of the suspension. Then, the arm and the suspension are heated at 250° C. by formic acid reflow. In the following, a heating temperature in the second step will be referred to as a "joining temperature."

Ten samples each of which comprises an arm, a suspension, and a joint part joining the two are manufactured by the above steps. Note that an area of a joint surface of the arm and the suspension (vertical width and horizontal width of joint part) is about 4 mm×4 mm.

[Evaluation of Joint Part]
Each sample is polished and a cross section of a central part of the sample is exposed. Here, the cross section of the central part is a cross section of the sample in a direction vertical to an interface between the arm and the joint part. The cross section of the central part can be also referred to as a cross section of the sample in a direction vertical to an interface between the joint part and the suspension. A cross section of a central part of each sample is observed with a scanning electron microscope (SEM) and a thickness of a joint part of each sample is measured. An average value of the thickness of the joint parts of the ten samples is listed in a table 1.

With an electron probe micro-analyzer (EPMA), an element distribution in a cross section of each sample is measured. Also, a line analysis in the cross section of each sample is performed with the EPMA. Based on the element distribution and the line analysis, composition in the joint part and a content of Sn (Sn amount) in the joint part are specified. The composition and the Sn amount in the joint part are listed in the following table 1.

An arm-side side surface of each sample is placed on a substantially horizontal surface of a pedestal and the arm is fixed to the pedestal. Then, a stick is pressed in a horizontal direction against a vertical end surface of the suspension. A load is applied to the end surface of the suspension with the stick. At a moment at which the suspension is detached from the arm (moment at which joint part is destroyed), a load (joint strength) applied to the end surface of the suspension with the stick is measured. In the measurement, a speed of the stick in the horizontal direction is adjusted to 0.02 mm/sec. With the ten samples, the same measurement is performed for ten times. An average value in the joint strength of the ten samples is listed in the following table 1. When metal-binding of the suspension and the arm to the joint part is adequate, it is assumed that the joint strength is equal to or higher than 1 kg. The joint strength is preferably equal to or higher than 1 kg.

[Change in Joining Temperature]
A sample of Example A1 is manufactured by a method similar to the above except for a point that a joining temperature is changed to a temperature listed in the following table 1. However, when the joining temperature is 150° C. and 200° C., no joint part is formed and the sample of Example A1 cannot be manufactured. In the following table, a column in which "X" is listed means that no joint part is formed at the joining temperature. When the joining temperature is 250° C., a joint part is formed and a sample of Example A1 is manufactured. The joint part formed at the joining temperature of 250° C. is evaluated in the above-described method. A result of the evaluation is listed in the following table 1.

Examples A2 to A16

In a first step in each example, a whole Ni film on a side of an arm is covered with a film having composition listed in a field of "arm film composition" in each of the following table 1 to table 3. Also, in the first step of each example, a whole Ni film on a side of a suspension is covered with a film listed in a field of "suspension film composition" in each of the following table 1 to table 3. Note that a numeric value assigned before each atomic symbol listed in each of the field of "arm film composition" and the field of "suspension film composition" means a content of each element (in percent by mass) in each film.

By a method similar to that of Example A1 except for the above point, samples of Examples A2 to A16 are manufactured and a joint part in each example is evaluated. Results of Examples A2 to A16 are listed in the following table 1 to table 3.

TABLE 1

| Example No | Arm film composition | Suspension film composition | Evaluation item | Joining temperature 150° C. | 200° C. | 250° C. | 300° C. |
|---|---|---|---|---|---|---|---|
| A1 | Sn | Sn | Thickness of joint part (μm) | X | X | 15 | 10.2 |
| | | | Composition of joint part | X | X | Sn, Ni, P | Sn, Ni, P |
| | | | Sn amount (percent by mass) | X | X | 87 | 80 |
| | | | Joint strength (Kg) | X | X | 3.7 | 4 |
| A2 | Sn | 96.5Sn—3.5Ag | Thickness of joint part (μm) | X | X | 15 | 9.4 |
| | | | Composition of joint part | X | X | 88 | 85 |
| | | | Sn amount (percent by mass) | X | X | Sn, Ag, Ni, P | Sn, Ag, Ni, P |
| | | | Joint strength (Kg) | X | X | 3.3 | 3.5 |
| A3 | Sn | 99.3Sn—0.7Cu | Thickness of joint part (μm) | X | X | 14.7 | 12.8 |
| | | | Composition of joint part | X | X | Sn, Cu, Ni, P | Sn, Cu, Ni, P |
| | | | Sn amount (percent by mass) | X | X | 84 | 80 |
| | | | Joint strength (Kg) | X | X | 3.2 | 3.3 |
| A4 | Sn | 42Sn—58Bi | Thickness of joint part (μm) | X | 14.4 | 10.3 | 6.7 |
| | | | Composition of joint part | X | Sn, Ni, Bi, P | Sn, Ni, Bi, P | Sn, Ni, Bi, P |
| | | | Sn amount (percent by mass) | X | 45 | 43 | 40 |
| | | | Joint strength (Kg) | X | 2.4 | 4 | 4.6 |
| A5 | Sn | 48Sn—52In | Thickness of joint part (μm) | 16.1 | 13.1 | 9.5 | 5.3 |
| | | | Composition of joint part | Sn, Ni, In, P | Sn, Ni, In, P | Sn, Ni, In, P | Sn, Ni, In, P |
| | | | Sn amount (percent by mass) | 65 | 63 | 57 | 50 |
| | | | Joint strength (Kg) | 2.1 | 3.5 | 3.8 | 4.2 |

TABLE 2

| Example No | Arm film composition | Suspension film composition | Evaluation item | Joining temperature 150° C. | 200° C. | 250° C. | 300° C. |
|---|---|---|---|---|---|---|---|
| A6 | Sn | 91Sn—9Zn | Thickness of joint part (μm) | X | X | 8.5 | 5.5 |
| | | | Composition of joint part | X | X | Sn, Ni, Zn, P | Sn, Ni, Zn, P |
| | | | Sn amount (percent by mass) | X | X | 76 | 70 |
| | | | Joint strength (Kg) | X | X | 2.3 | 3.2 |
| A7 | Sn | Ni | Thickness of joint part (μm) | X | X | 18.3 | 17.5 |
| | | | Composition of joint part | X | X | Sn, Ni, P | Sn, Ni, P |
| | | | Sn amount (percent by mass) | X | X | 84 | 78 |
| | | | Joint strength (Kg) | X | X | 2.7 | 3.4 |
| A8 | Sn | Ni—P | Thickness of joint part (μm) | X | X | 9.1 | 8.2 |
| | | | Composition of joint part | X | X | Sn, Ni, P | Sn, Ni, P |
| | | | Sn amount (percent by mass) | X | X | 80 | 72 |
| | | | Joint strength (Kg) | X | X | 2.5 | 3.1 |
| A9 | Sn | Bi | Thickness of joint part (μm) | X | X | 16.5 | 15.1 |
| | | | Composition of joint part | X | X | Sn, Ni, Bi, P | Sn, Ni, Bi, P |
| | | | Sn amount (percent by mass) | X | X | 65 | 52 |
| | | | Joint strength (Kg) | X | X | 2.8 | 3.5 |
| A10 | Sn | Cu | Thickness of joint part (μm) | X | X | 17.3 | 15 |
| | | | Composition of joint part | X | X | Sn, Ni, Cu, P | Sn, Ni, Cu, P |
| | | | Sn amount (percent by mass) | X | X | 76 | 70 |
| | | | Joint strength (Kg) | X | X | 2.4 | 3.7 |

TABLE 3

| Example No | Arm film composition | Suspension film composition | Evaluation item | Joining temperature 150° C. | 200° C. | 250° C. | 300° C. |
|---|---|---|---|---|---|---|---|
| A11 | Ni—P | Sn | Thickness of joint part (μm) | X | X | 15.1 | 13.2 |
| | | | Composition of joint part | X | X | Sn, Ni, P | Sn, Ni, P |
| | | | Sn amount (percent by mass) | X | X | 67 | 70 |
| | | | Joint strength (Kg) | X | X | 2.9 | 3.4 |
| A12 | Ni—P | 42Sn—58Bi | Thickness of joint part (μm) | X | 13.6 | 12.2 | 10.2 |
| | | | Composition of joint part | X | Sn, Ni, Bi, P | Sn, Ni, Bi, P | Sn, Ni, Bi, P |

TABLE 3-continued

| Example No | Arm film composition | Suspension film composition | Evaluation item | Joining temperature | | | |
|---|---|---|---|---|---|---|---|
| | | | | 150° C. | 200° C. | 250° C. | 300° C. |
| A13 | 42Sn—58Bi | Sn | Sn amount (percent by mass) | X | 40 | 38 | 36 |
| | | | Joint strength (Kg) | X | 2.5 | 3 | 4 |
| | | | Thickness of joint part (μm) | X | 13.4 | 10.5 | 8.5 |
| | | | Composition of joint part | X | Sn, Ni, Bi, P | Sn, Ni, Bi, P | Sn, Ni, Bi, P |
| A14 | Sn | Ni—P | Sn amount (percent by mass) | X | 47 | 45 | 42 |
| | | | Joint strength (Kg) | X | 3 | 3.4 | 4.5 |
| | | | Thickness of joint part (μm) | X | X | 10.4 | 8.6 |
| | | | Composition of joint part | X | X | Sn, Ni, Bi, P | Sn, Ni, Bi, P |
| A15 | Sn | Au | Sn amount (percent by mass) | X | X | 69 | 64 |
| | | | Joint strength (Kg) | X | X | 2.4 | 2.2 |
| | | | Thickness of joint part (μm) | X | X | 7.4 | 4.5 |
| | | | Composition of joint part | X | X | Sn, Ni, Au, P | Sn, Ni, Au, P |
| A16 | Sn | In | Sn amount (percent by mass) | X | X | 47 | 42 |
| | | | Joint strength (Kg) | X | X | 1.7 | 3.1 |
| | | | Thickness of joint part (μm) | X | 10.1 | 7.3 | 5.5 |
| | | | Composition of joint part | X | Sn, Ni, In, P | Sn, Ni, In, P | Sn, Ni, In, P |
| | | | Sn amount (percent by mass) | X | 53 | 48 | 43 |
| | | | Joint strength (Kg) | X | 2.1 | 2.4 | 3.4 |

Example B1

In a second step in Example B1, ultrasonic joining is employed instead of heating by formic acid reflow. That is, a surface (Sn film) of a leading end part of an arm and a surface (Sn film) of a suspension are overlapped with each other and an ultrasonic wave is applied to the arm and the suspension, whereby a joint part is formed.

By a method similar to that of Example A1 except for the above point, a sample of Example B1 is manufactured and a joint part in Example B1 is evaluated. A result of Example B1 is listed in the following table 4.

Examples B2 to B8

In a first step in each example, a whole Ni film on a side of an arm is covered with a film having composition listed in a field of "arm film composition" in the following table 4. Also, in a first step in each example, a whole Ni film on a side of a suspension is covered with a film listed in a field of "suspension film composition" in the following table 4.

By a method similar to that of Example B1 except for the above point, samples of Examples B2 to B8 are manufactured and a joint part in each example is evaluated. Results of Examples B2 to 138 are listed in the following table 4.

TABLE 4

| Example No | Arm film composition | Suspension film composition | Evaluation item | |
|---|---|---|---|---|
| B1 | Sn | Sn | Thickness of joint part (μm) | 19.1 |
| | | | Composition of joint part | Sn, Ni, P |
| | | | Sn amount (percent by mass) | 95 |
| | | | Joint strength (Kg) | 2.8 |
| B2 | Sn | 42Sn—58Bi | Thickness of joint part (μm) | 18.3 |
| | | | Composition of joint part | Sn, Bi, P, Ni |
| | | | Sn amount (percent by mass) | 40 |
| | | | Joint strength (Kg) | 3 |
| B3 | Sn | 48Sn—52In | Thickness of joint part (μm) | 18.2 |
| | | | Composition of joint part | Sn, In, P, Ni |
| | | | Sn amount (percent by mass) | 56 |
| | | | Joint strength (Kg) | 2.7 |
| B4 | Sn | Ni | Thickness of joint part (μm) | 19.4 |
| | | | Composition of joint part | Sn, Ni, P |
| | | | Sn amount (percent by mass) | 87 |
| | | | Joint strength (Kg) | 1.6 |
| B5 | Sn | Ni—P | Thickness of joint part (μm) | 19.2 |
| | | | Composition of joint part | Sn, Ni, P |
| | | | Sn amount (percent by mass) | 90 |
| | | | Joint strength (Kg) | 1.4 |
| B6 | Sn | Bi | Thickness of joint part (μm) | 19.4 |
| | | | Composition of joint part | Sn, Bi, P, Ni |
| | | | Sn amount (percent by mass) | 54 |
| | | | Joint strength (Kg) | 1.8 |
| B7 | Sn | Cu | Thickness of joint part (μm) | 19.7 |
| | | | Composition of joint part | Sn, Cu, P, Ni |
| | | | Sn amount (percent by mass) | 76 |
| | | | Joint strength (Kg) | 2 |
| B8 | Ni—P | Sn | Thickness of joint part (μm) | 19 |
| | | | Composition of joint part | Sn, Ni, P |
| | | | Sn amount (percent by mass) | 83 |
| | | | Joint strength (Kg) | 1.6 |

Example C1

In a second step in Example C1, a joint part is formed by direct-heating with a heater instead of formic acid reflow.

By a method similar to that of Example A1 except for the above point, a sample of Example C1 is manufactured and a joint part in Example C1 is evaluated. A result of Example C1 is listed in the following table 5.

Examples C2 to C10

In a first step in each example, a whole Ni film on a side of an arm is covered with a film having composition listed in a field of "arm film composition" in the following table 5. Also, in a first step in each example, a whole Ni film on a side of a suspension is covered with a film listed in a field of "suspension film composition" in the following table 5.

By a method similar to that of Example C1 except for the above point, samples of Examples C2 to C10 are manufactured and a joint part in each example is evaluated. Results of Examples C2 to C10 are listed in the following table 5.

TABLE 5

| Example No | Arm film composition | Suspension film composition | Evaluation item | |
|---|---|---|---|---|
| C1 | Sn | Sn | Thickness of joint part (μm) | 12 |
| | | | Composition of joint part | Sn, Ni, P |
| | | | Sn amount (percent by mass) | 90 |
| | | | Joint strength (Kg) | 3.1 |
| C2 | Sn | 42Sn—58Bi | Thickness of joint part (μm) | 10.3 |
| | | | Composition of joint part | Sn, Bi, Ni, P |
| | | | Sn amount (percent by mass) | 64 |
| | | | Joint strength (Kg) | 3.5 |
| C3 | Sn | 48Sn—52In | Thickness of joint part (μm) | 11.3 |
| | | | Composition of joint part | Sn, In, Ni, P |
| | | | Sn amount (percent by mass) | 78 |
| | | | Joint strength (Kg) | 2.9 |
| C4 | Sn | Ni | Thickness of joint part (μm) | 16 |
| | | | Composition of joint part | Sn, Ni, P |
| | | | Sn amount (percent by mass) | 89 |
| | | | Joint strength (Kg) | 2 |
| C5 | Sn | Ni—P | Thickness of joint part (μm) | 15.5 |
| | | | Composition of joint part | Sn, Ni, P |
| | | | Sn amount (percent by mass) | 83 |
| | | | Joint strength (Kg) | 1.9 |
| C6 | Sn | Bi | Thickness of joint part (μm) | 14 |
| | | | Composition of joint part | Sn, Bi, Ni, P |
| | | | Sn amount (percent by mass) | 43 |
| | | | Joint strength (Kg) | 2.6 |
| C7 | Sn | Cu | Thickness of joint part (μm) | 14.7 |
| | | | Composition of joint part | Sn, Cu, P, Ni |
| | | | Sn amount (percent by mass) | 74 |
| | | | Joint strength (Kg) | 2.3 |
| C8 | Ni—P | Sn | Thickness of joint part (μm) | 15.4 |
| | | | Composition of joint part | Sn, Ni, P |
| | | | Sn amount (percent by mass) | 78 |
| | | | Joint strength (Kg) | 2 |
| C9 | Ni—P | 42Sn—58Bi | Thickness of joint part (μm) | 14.8 |
| | | | Composition of joint part | Sn, Bi, Ni, P |
| | | | Sn amount (percent by mass) | 40 |
| | | | Joint strength (Kg) | 2.6 |
| C10 | Ni | Sn | Thickness of joint part (μm) | 6.8 |
| | | | Composition of joint part | Sn, Ni, P |
| | | | Sn amount (percent by mass) | 68 |
| | | | Joint strength (Kg) | 3 |

Example D1

In a first step in Example D1, each film is formed by sputtering instead of an electrolytic plating method.

By a method similar to that of Example A1 except for the above point, a sample of Example D1 is manufactured and a joint part in Example D1 is evaluated. A result of Example D1 is listed in the following table 6.

TABLE 6

| Example No | Arm film composition | Suspension film composition | Evaluation item | Heat-Treatment temperature | | |
|---|---|---|---|---|---|---|
| | | | | 200° C. | 250° C. | 300° C. |
| D1 | Sn | Sn | Thickness of joint part (μm) | X | 12 | 9.5 |
| | | | Composition of joint part | X | Sn, Ni, P | Sn, Ni, P |

TABLE 6-continued

| Example No | Arm film composition | Suspension film composition | Evaluation item | Heat-Treatment temperature | | |
|---|---|---|---|---|---|---|
| | | | | 200° C. | 250° C. | 300° C. |
| | | | Sn amount (percent by mass) | X | 91 | 84 |
| | | | Joint strength (Kg) | X | 1.6 | 2 |

Example E1

In Example E1, a joint part having a thickness listed in the following table 7 is formed by adjustment of a thickness of each film in a first step. That is, in Example E1, six samples comprising joint parts with different thicknesses are manufactured. In the first step, a thickness of a Sn film covering a Ni film on a side of an arm is adjusted in a range of 1 to 50 μm. In the first step, a thickness of a Sn film covering a Ni film on a side of a suspension is also adjusted in a range of 1 to 50 μm. The thickness of the joint part in each sample of Example E1 is specified by a method similar to that of Example A1. In a second step in Example E1, generation of bleeding in a joint part formed by heating is checked with a stereomicroscope.

A sample of Example E1 is manufactured by a method similar to that of Example A1 except for the above point. By the method similar to that of Example A1, joint strength of a joint part in each sample of Example E1 is measured.

A result of Example E1 is listed in the following table 7.

Examples E2 to E5

In a first step in each example, a whole Ni film on a side of an arm is covered with a film having composition listed in a field of "arm film composition" in the following table 7. Also, in the first step of each example, a whole Ni film on a side of a suspension is covered with a film listed in a field of "suspension film composition" in the following table 7.

By a method similar to that of Example E1 except for the above point, samples of Examples E2 to E5 are manufactured and a joint part in each example is evaluated. Results of Examples E2 to E5 are listed in the following table 7.

TABLE 7

| Example No | Arm film composition | Suspension film composition | Evaluation item | | | | | |
|---|---|---|---|---|---|---|---|---|
| E1 | Sn | Sn | Thickness of joint part (μm) | 1.8 | 3.7 | 9 | 30 | 53 | 60 |
| | | | Joint strength (Kg) | 1 | 1.2 | 3.1 | 3.4 | 2.9 | 2.4 |
| | | | Bleeding | Not generated | Not generated | Not generated | Not generated | Not generated | Generated |
| E2 | Sn | 42Sn—58Bi | Thickness of joint part (μm) | 2.1 | 4.6 | 11.2 | 28 | 50 | 61 |
| | | | Joint strength (Kg) | 1.1 | 1.6 | 2.6 | 3 | 2.2 | 1.8 |
| | | | Bleeding | Not generated | Not generated | Not generated | Not generated | Not generated | Generated |
| E3 | Sn | Bi | Thickness of joint part (μm) | 3.5 | 4.8 | 12.4 | 32 | 51 | 65 |
| | | | Joint strength (Kg) | 1.2 | 1.6 | 2.3 | 2.5 | 2.1 | 1.8 |
| | | | Bleeding | Not generated | Not generated | Not generated | Not generated | Not generated | Generated |
| E4 | Sn | 48Sn—52In | Thickness of joint part (μm) | 1.7 | 3.6 | 8.5 | 34 | 50 | 59 |
| | | | Joint strength (Kg) | 1 | 1.9 | 2.1 | 2.5 | 2.4 | 1.7 |
| | | | Bleeding | Not generated | Not generated | Not generated | Not generated | Not generated | Generated |
| E5 | 42Sn—58Bi | 48Sn—52In | Thickness of joint part (μm) | 2.1 | 4.2 | 11.4 | 30 | 53 | 58 |
| | | | Joint strength (Kg) | 1.4 | 2.3 | 2.4 | 2.8 | 1.8 | 1.5 |
| | | | Bleeding | Not generated | Not generated | Not generated | Not generated | Not generated | Generated |

Examples F1 to F4

In a first step in each of Examples F1 and F2, no Sn film is formed on a side of an arm after a whole surface of the arm is covered with a Ni film (film consisting of Ni).

In a first step in each of Examples F3 and F4, neither a Ni film nor a Sn film is formed on a side of an arm. That is, an arm covered with a Ni—P film is used in a second step.

Also, in the first step in each of Examples F1 to F4, a whole Ni film on a side of a suspension is covered with a film listed in a field of "suspension film composition" in the following table 8.

In each of Examples F1 to F4, a joint part having a thickness listed in the following table 8 is formed by adjustment of a thickness of each film in the first step. That is, in each of Examples F1 to F4, four samples comprising joint parts with different thicknesses are manufactured.

By a method similar to that of Example E1 except for the above point, samples of Examples F1 to F4 are manufactured and a joint part in each example is evaluated. Results of Examples F1 to F4 are listed in the following table 8.

TABLE 8

| Example No | Arm film composition | Suspension film composition | Evaluation item | | | | |
|---|---|---|---|---|---|---|---|
| F1 | Ni | Sn | Thickness of joint part (μm) | 1.9 | 27.2 | 50 | 60 |
| | | | Joint strength (Kg) | 1.4 | 1.8 | 1.9 | 1.3 |
| | | | Bleeding | Not generated | Not generated | Not generated | Generated |
| F2 | Ni | 42Sn—58Bi | Thickness of joint part (μm) | 3.7 | 15.8 | 51 | 62 |
| | | | Joint strength (Kg) | 1.6 | 2.1 | 2.3 | 1.5 |
| | | | Bleeding | Not generated | Not generated | Not generated | Generated |
| F3 | Ni—P | Sn | Thickness of joint part (μm) | 4.9 | 28 | 53 | 59 |
| | | | Joint strength (Kg) | 1.2 | 1.5 | 1.8 | 1.5 |
| | | | Bleeding | Not generated | Not generated | Not generated | Generated |
| F4 | Ni—P | 42Sn—58Bi | Thickness of joint part (μm) | 3 | 13.5 | 51 | 60 |
| | | | Joint strength (Kg) | 1.3 | 1.6 | 1.9 | 1.7 |
| | | | Bleeding | Not generated | Not generated | Not generated | Generated |

Comparative Example

In Comparative Example, an arm and a suspension that are the same with those of Example A1 are used. However, in Comparative Example, a first step and a second step are not performed. In Comparative Example 1, a fitting hole is formed in each of the arm and the suspension. Here, φ of each fitting hole is 0.2 mm. Then, by fitting and joining of the arm and the suspension, a sample of Comparative Example 1 is manufactured. By a method similar to that of Example 1, joint strength in Comparative Example 1 is measured. The joint strength in Comparative Example 1 is 0.8 kg and is lower than joint strength of any other Examples.

REFERENCE SIGNS LIST

2 . . . HSA (magnetic head device), 4 . . . arm, 4a . . . arm-side joint surface, 4b . . . surface adjacent to arm-side joint surface (side surface), 4c . . . rear surface of arm-side joint surface, 6 . . . carriage, 8 . . . suspension, 8a . . . suspension-side joint surface, 8b . . . surface adjacent to suspension-side joint surface (side surface), 8c . . . rear surface of suspension-side joint surface, 10 . . . slider, 11 . . . HGA, 12 . . . joint part, 14 . . . coil part, 16 . . . magnetic disk, 18 . . . magnetic disk device, 20 . . . spindle motor, 22 . . . permanent magnet, 34 . . . arm film, 38 . . . suspension film

What is claimed is:

1. A magnetic head device comprising:
   an arm;
   a suspension overlapping with a leading end part of the arm;
   a slider located at a leading end part of the suspension; and
   a joint part located between the leading end part of the arm and the suspension, and joining the arm and the suspension; wherein the joint part has at least one layer held between the leading end part of the arm and the suspension; and
   wherein the joint part includes Sn.

2. The magnetic head device according to claim 1, wherein
   the joint part includes an alloy containing Sn, and
   the alloy contains at least one kind selected from the group consisting of Ag, Cu, Bi, In, Ni, Zn, P, and Au.

3. The magnetic head device according to claim 1, wherein a content of Sn in the joint part is equal to or larger than 40 percent by mass and smaller than 100 percent by mass.

4. The magnetic head device according to claim 1, wherein a thickness of the joint part is 2 to 50 μm.

5. The magnetic head device according to claim 1, wherein when an arm-side joint surface is defined as a surface of the arm which surface faces the suspension, a basis material of the arm is exposed on a surface adjacent to the arm-side joint surface.

6. The magnetic head device according to claim 1, wherein
   when an arm-side joint surface is defined as a surface of the arm which surface faces the suspension, a protective layer covering a basis material of the arm is exposed on a surface adjacent to the arm-side joint surface, and
   the protective layer includes Ni and P.

7. The magnetic head device according to claim 1, wherein when a suspension-side joint surface is defined as a surface of the suspension which surface faces the arm, a basis material of the suspension is exposed on a surface adjacent to the suspension-side joint surface.

8. The magnetic head device according to claim 1, further comprising a carriage having a plurality of arms.

9. The magnetic head device according to claim 1, wherein the device is produced by a production method comprising a first step of covering at least one of a surface of the arm and a surface of the suspension with an alloy containing Sn or with a Sn elementary substance, and a second step of making the surface of the arm and the surface of the suspension come into contact with each other after the first step and of forming the joint part.

10. The magnetic head device according claim 9, wherein the alloy is used in the first step, and the alloy contains at least one kind selected from the group consisting of Ag, Cu, Bi, In, Ni, Zn, P, and Au.

11. The magnetic head device according to claim 9, wherein in the first step, one of the surface of the arm and the surface of the suspension is covered with the alloy or the Sn elementary substance and the other surface is covered with a metal having a melting point higher than that of the alloy or with a metal having a melting point higher than that of the Sn elementary substance.

12. The magnetic head device according to claim 11, wherein the other surface is covered with a Ni elementary substance or Ni including P.

\* \* \* \* \*